(12) United States Patent
Do et al.

(10) Patent No.: US 10,547,883 B2
(45) Date of Patent: Jan. 28, 2020

(54) DATA FLOW CONTROL METHOD AND SYSTEM

(71) Applicant: Orbital Multi Media Holdings Corporation, Tortola (VG)

(72) Inventors: Manh Hung Peter Do, Vancouver (CA); Shuxun Cao, Shenzhen (CN)

(73) Assignee: Orbital Multi Media Holdings Corporation, Tortola (VG)

( * ) Notice: Subject to any disclaimer, the term of this patent is extended or adjusted under 35 U.S.C. 154(b) by 0 days.

(21) Appl. No.: 15/301,589

(22) PCT Filed: Apr. 1, 2015

(86) PCT No.: PCT/GB2015/051026
§ 371 (c)(1),
(2) Date: Oct. 3, 2016

(87) PCT Pub. No.: WO2015/150812
PCT Pub. Date: Oct. 8, 2015

(65) Prior Publication Data
US 2017/0188056 A1    Jun. 29, 2017

(30) Foreign Application Priority Data

Apr. 3, 2014   (GB) .................................. 1406048.7
Oct. 17, 2014  (GB) .................................. 1418455.0

(51) Int. Cl.
*H04N 7/173*     (2011.01)
*H04N 21/238*    (2011.01)
(Continued)

(52) U.S. Cl.
CPC ....... *H04N 21/238* (2013.01); *H04L 43/0882* (2013.01); *H04L 45/24* (2013.01);
(Continued)

(58) Field of Classification Search
CPC .... H04N 7/17318; H04N 7/165; H04N 7/173; H04N 21/235; H04N 21/435
(Continued)

(56) References Cited

U.S. PATENT DOCUMENTS 5,873,022 A * 2/1999 Huizer .................... G06T 9/007
                                                    348/E7.071
6,543,053 B1 * 4/2003 Li ...................... H04N 7/17318
                                                    348/E7.071
(Continued)

FOREIGN PATENT DOCUMENTS

EP    2308200 A1    4/2011
EP    3022884 A1    5/2015
(Continued)

OTHER PUBLICATIONS

Y. Zhao et al., "A Rate Adaptive Algorithm for HTTP Streaming," Proceedings of the 2012 IEEE 2nd International Conference on Cloud Computing and Intelligence System (CCIS), Hangzhou, China, Oct. 30-Nov. 1, 2012, IEEE, vol. 1, pp. 529-532.
(Continued)

*Primary Examiner* — Annan Q Shang
(74) *Attorney, Agent, or Firm* — Blank Rome LLP (57) ABSTRACT

A data flow control method for managing the flow of media data from a sending node to a receiving node over a communication network, the receiving node capable of playing said media data, wherein the data transmitted to the receiving node is a sequence of data segments encoded at a plurality of different data rates, and wherein the data flow control method is implemented by the receiving node for controlling the flow of said data from the sending node to the receiving node, the method further comprising: identifying a condition of the communication network between said sending and receiving nodes; identifying a condition of the data buffer at the receiving node; and adjusting the media
(Continued)

data flow through said communication network based on the identified condition of the communication network and the identified condition of the receiving node.

19 Claims, 5 Drawing Sheets

(51) Int. Cl.
| | |
|---|---|
| H04L 29/06 | (2006.01) |
| H04N 21/44 | (2011.01) |
| H04N 21/6373 | (2011.01) |
| H04N 21/845 | (2011.01) |
| H04L 12/825 | (2013.01) |
| H04L 12/26 | (2006.01) |
| H04L 12/707 | (2013.01) |
| H04L 12/853 | (2013.01) |

(52) U.S. Cl.
CPC .......... *H04L 47/2416* (2013.01); *H04L 47/25* (2013.01); *H04L 65/4092* (2013.01); *H04N 21/44004* (2013.01); *H04N 21/6373* (2013.01); *H04N 21/8456* (2013.01); *H04L 65/4069* (2013.01); *Y02D 50/10* (2018.01)

(58) Field of Classification Search
USPC .............. 725/91–94, 114–118; 709/217–232
See application file for complete search history.

(56) References Cited

U.S. PATENT DOCUMENTS

| | | | | |
|---|---|---|---|---|
| 7,240,359 | B1* | 7/2007 | Sie | H04N 7/17318 348/E7.071 |
| 7,512,700 | B2* | 3/2009 | Bestgen | G06F 17/30516 709/231 |
| 8,806,045 | B2* | 8/2014 | Turner | G06F 17/30132 709/231 |
| 2003/0067872 | A1* | 4/2003 | Harrell | H04L 29/06027 370/229 |
| 2003/0074456 | A1* | 4/2003 | Yeung | H04L 29/06 709/229 |
| 2003/0107994 | A1* | 6/2003 | Jacobs | H04L 47/10 370/235 |
| 2003/0149715 | A1* | 8/2003 | Ruutu | H04L 29/06 718/100 |
| 2004/0010593 | A1* | 1/2004 | Apostolopoulos | H04L 67/1008 709/226 |
| 2004/0165530 | A1* | 8/2004 | Bedekar | H04L 47/10 370/235 |
| 2006/0104345 | A1 | 5/2006 | Millar et al. | |
| 2006/0109856 | A1 | 5/2006 | Deshpande | |
| 2006/0150225 | A1* | 7/2006 | Hegg | H04N 5/76 725/89 |
| 2007/0171830 | A1 | 7/2007 | Vulkan et al. | |
| 2008/0112315 | A1* | 5/2008 | Hu | H04N 7/17318 370/230 |
| 2008/0134258 | A1* | 6/2008 | Goose | H04N 7/17336 725/91 |
| 2009/0089445 | A1* | 4/2009 | Deshpande | G06F 15/16 709/231 |
| 2009/0119734 | A1* | 5/2009 | Deshpande | H04N 7/17318 725/118 |
| 2009/0144431 | A1* | 6/2009 | Kisel | G06Q 30/02 709/227 |
| 2009/0161545 | A1* | 6/2009 | Ho | H04L 47/225 370/235 |
| 2010/0146569 | A1* | 6/2010 | Janardhan | H04N 7/17318 725/98 |
| 2012/0110162 | A1 | 5/2012 | Dubovik et al. | |
| 2012/0257501 | A1* | 10/2012 | Kucharczyk | H04L 47/30 370/235 |
| 2013/0054822 | A1* | 2/2013 | Mordani | H04L 67/1034 709/228 |
| 2013/0227080 | A1 | 8/2013 | Gao et al. | |
| 2013/0290492 | A1* | 10/2013 | ElArabawy | H04L 65/80 709/219 |
| 2014/0215537 | A1* | 7/2014 | Youssefmir | H04N 21/23106 725/90 |
| 2014/0328182 | A1* | 11/2014 | Gao | H04W 28/08 370/236 |
| 2015/0067722 | A1* | 3/2015 | Bjordammen | H04N 21/2625 725/32 |
| 2015/0134784 | A1* | 5/2015 | De Vleeschauwer | H04L 65/605 709/219 |
| 2015/0288732 | A1* | 10/2015 | Phillips | H04L 65/60 709/219 |
| 2015/0341812 | A1* | 11/2015 | Dion | H04W 24/08 370/252 |
| 2016/0156942 | A1* | 6/2016 | Bao | H04L 65/605 725/116 |

FOREIGN PATENT DOCUMENTS

| | | |
|---|---|---|
| WO | WO 03/028296 A1 | 4/2003 |
| WO | WO 2009/149100 A1 | 12/2009 |
| WO | WO 2010/012066 A1 | 2/2010 |
| WO | WO 2010/012067 A1 | 2/2010 |
| WO | WO 2013/087793 A1 | 6/2013 |
| WO | WO 2015/009684 A1 | 1/2015 |

OTHER PUBLICATIONS

A. Raghuvcer et al., "A Network—Aware Approach Video and Metadata Streaming," IEEE Transactions on Circuits and Systems for Video Technology, IEEE, vol. 17, No. 8, Aug. 2007, pp. 1028-1040.

* cited by examiner

DATA FLOW CONTROL METHOD AND SYSTEM

1. FIELD OF THE INVENTION

The present application relates to data transmission protocols for media data being transmitted from a streaming server to one or more client devices. More particularly the present invention provides an enhanced data flow control method that can be used in conjunction with an existing streaming protocol such as HTTP Live streaming (also known as HLS). The method according to the present invention takes into consideration network conditions and client device conditions, such as the data buffer of the client device, and one or more data flow control methods or modes are applied at the client device to improve the speed and quality of media data transmission for Internet protocol television (IPTV) applications.

2. BACKGROUND

Video traffic is currently accountable for over 60% of the world's bandwidth usage over communication networks such as the Internet or any similar wireless communication network today such as LANs, WLANs etc. How such data is injected into a network has a strong influence on the overall data flow through the network. Uncontrolled data injection into a network can lead to congestion impacts such as slow overall traffic flow, packet delay, packet loss, packet out of order, packet re-transmission, flooding/crashing of network devices (routers, switches etc.), and flooding of uncontrollable traffic. These types of events cause network traffic to slow down and sometimes to come to a complete stop if the switching & routing network equipment in use is unable to cope with the flow demand. Additionally, unmanaged data injection will have a negative impact for applications that rely on real-time communication such as VoIP (Voice over IP), live broadcasts of media events, real-time video conferences and other time-sensitive applications.

HTTP Live streaming (HLS, and referred as such herein after) is a HTTP-based media streaming communications protocol currently being implemented. HLS functions by breaking the overall data stream into a sequence of small HTTP-based file downloads; each download loading one short portion or chunk of an overall potentially unbounded transport stream. As the stream is played, the client player or client device, which may be a set top box or a smart media player may select from a number of different streams containing the same material, but encoded at a plurality of different data rates, allowing the streaming session to adapt to the available data rates. At the start of the streaming session, the client device is arranged to download an extended M3U (m3u8) playlist, i.e. for specifying the locations of one or more media files, containing the metadata for the various sub-streams which are available. Since HLS based requests use standard HTTP transactions, HLS is capable of traversing any firewall or proxy server that lets through standard HTTP traffic, unlike User Datagram Protocol (UDP)-based protocols such as Real-time Transfer Protocol (RTP). This also allows content to be delivered over widely available Content Delivery Networks (CDN).

HLS also specifies a standard encryption mechanism using Advanced Encryption Standard (AES) and a method of secure key distribution using HTTPS with either a device specific login or HTTP cookie, such as a session key, which together, can provide a simple Digital Rights Management (DRM) system.

HLS also supports adaptive bit rate technology, which is controlled by the client side device, based on available download bandwidth. More specifically, as in implementations in use today, adaptive bitrate streaming is a method of video streaming over HTTP where the source content is encoded at multiple bit rates. Each of the different bit rate streams are then segmented into small multi-second parts. The streaming client is made aware of the available streams at differing bit rates, and segments of the streams by a manifest file. When starting, the client requests the segments from the lowest bit rate stream. If the client finds the download speed is greater than the bit rate of the segment downloaded, then it will request the next higher bit rate segments. Later, if the client finds the download speed for a segment is lower than the bit rate for the segment, and therefore the network throughput has deteriorated, it will request a lower bit rate segment. The segment size can vary depending on the particular implementation, but they are typically between two and ten seconds.

Conventional HLS exposes many flaws on the client device, i.e. player side, which can impact both bandwidth usage and user viewing experience. These drawbacks can include all or any of the following: uncontrollable video quality; poor bandwidth usage between transport stream (TS) segments; inability to co-exist with other HLS clients intelligently; inability to achieve fast video acquisition; inability to aggressively compete with other traffic; inability to avoid congested networks; inability to minimize video buffering over public networks; inability to give priority to other traffic, and inability to recycle data.

Therefore, there exists a need for a new data flow control method or protocol for data packet transmission over a communication network that overcomes the drawbacks of conventional HLS and which can work in conjunction with existing systems that are set up for HLS.

3. SUMMARY OF THE INVENTION

In one aspect, the present invention provides a data flow control method for managing the flow of media data from a sending node to a receiving node over a communication network, the receiving node capable of playing said media data, wherein the data transmitted to the receiving node is a sequence of data segments encoded at a plurality of different data rates, and wherein the data flow control method is implemented by the receiving node for controlling the flow of said data from the sending node to the receiving node, the method further comprising:

identifying a condition of the communication network between said sending and receiving nodes;

identifying a condition of the data buffer at the receiving node;

and adjusting the media data flow through said communication network based on the identified condition of the communication network and the identified condition of the receiving node.

5. DETAILED DESCRIPTION OF THE EMBODIMENTS

The present invention provides a data flow control protocol or method which overcomes the drawbacks of conventional HLS set out above in the Background section. The data flow control method according to the present invention is implemented or deployed on the client side device or media player as a module or "plugin" and is comprised of a multiple intelligent data streaming flow control protocols and algorithms, for instance such as adopted from the flow control techniques described based on TCP/IP, UDP and RTSP in GB patent nos. 2477515 and 2477640 and GB patent application number 1406048.7.

According to the present invention, all data flow controls are implemented on the client, which could be a multimedia user terminal such as media player or set top box or a mobile terminal for receiving multimedia data from a streaming server, for providing an enhanced solution without requiring any changes to be made to existing HLS server systems that are already in place and in use for conventional HLS transmissions. Thus the data flow control methods according to the present invention can be deployed in conjunction with any existing HLS systems and a wide variety of Content Delivery Networks (CDNs). The data flow control methods according to the invention provides the client player the ability to navigate intelligently through busy and congested communication networks such as the Internet, make optimal use of the available network bandwidth, adapt intelligently to the existing network connections and resources and provide the user with an enhanced and improved IPTV experience.

In one aspect, embodiments of the data flow control methods of present invention handle data flow management on the application layer of the OSI model. Though the present invention is concerned with media data and specifically video data for IPTV services, a skilled person would easily understand that the present invention can be used for managing the flow of any type of data and information that can be transported over communication network such as the Internet.

The data flow control method according to a first embodiment of the present invention is based on monitoring one or more network conditions as well as one or more receiving node or client side conditions (client device such as a player or a set-top box for receiving the data). The modules to implement the data flow controls for HLS streaming applications are only deployed at the client and no modification or change is made to the server side devices. Based on the conditions detected at the client device at which the data flow controls may be implemented, the flow control method according to the first embodiment is able to calculate and predict the network environment and accordingly modify the settings or receiver conditions at the client device accordingly to provide an enhanced data streaming protocol using existing HLS systems where the data stream is broken up an sent as a sequence of small HTTP-based file downloads, a client player is arranged to download these individual segments to download the transport stream.

Upon a network condition being detected at the client, the flow control method according to the present invention is capable of applying one or more data flow modes (these modes are explained in detail below) to ensure that high quality multimedia video data can be streamed over the communication network.

The data flow control method is capable of implementing one or more modules which reside on the client side terminals. The client device, equipped with the modules for implementing such flow controls functions to predict the network flow, adjust data flow, enhance video quality, navigate through various network routes to maintain a good IPTV user experience that conventional data transmission protocols such as TCP, UDP or HLS cannot offer.

In a second embodiment, the data flow control method of the present invention incorporates quality control modes or mechanisms and protocols for providing high video quality delivery and maintaining smoothness of video playback on any network.

Balancing between fast response time, efficient use of bandwidth, smooth data flow and quality of data are some of the objectives of the present application. The application layer data flow control method according to the present invention comprises data flow control methods and video quality control methods. In the present invention, network conditions and buffer conditions are be detected from the client or end user receiving node/player that implement module and protocols for the dataflow control method to reach to these changes. No change is made to the server or original source or intermediate nodes.

5.1 First Embodiment

According to a first embodiment of the data flow control method of the present invention, a plurality of data flow control modes are applied at the client device based on network conditions and buffer conditions detected at the client device. The data flow control methods of the first embodiment define techniques for downloading the TS segments in HLS systems at the client device. These modes collaborate to produce improved media flow performance for HLS based system and transparently adapt to any IP networks. These modes are as follows:

1. Speed-Up
2. Back-Off
3. Trickle
4. Dynamic-Multi-Links
5. Intelligent-Auto-Routes
6. Concurrent Multi-Paths The first three modes of data flow control according to the first embodiment, i.e. Speed-Up, Back-Off and Trickle are significant components of the data download mechanism used by a client player receiving HLS data. In one aspect, these modes operate in conjunction with one another. The other modes, i.e. Dynamic Multi-Links, Intelligent-Auto-Routes and Concurrent-Multi-Paths preferred modes that provide assistance to or complement the first three download modes. In a preferred embodiment, these modes interact dynamically to provide intelligence to a HLS player i.e. the client. The implementation of the data flow control modes of the first embodiment enable Internet Service Providers (ISPs) to increase subscribers existing infrastructure, reduce network requirements and improves user experience, whilst being fully compatible with the HLS standards and servers.

In addition to the above modes, the data flow control method according to the first embodiment also provides a mode for enabling data sharing and recycling:

7. Authorized Data Recycling & Sharing Mode

This made be provided in addition to managing data flow control using one or more of the six modes set out above. In another aspect, the mode for data recycling or sharing can also be provided as a separate mode of data flow control, without one or more of the above six modes.

5.1.1 Speed Up:

The Speed-Up mode implemented on the Client Player enables the client to download incoming data as fast as possible whilst working in conjunction with the other assisting modes: Dynamic-Multi-Links, Intelligent-Auto-Routes and Concurrent-Multi-Paths. This data flow mode is configured to become active at the beginning of each playing session and to remain active until the local buffer at the client reaches approximately 80% full or until a pre-determined or set receiving limit is reached for the client. This is to ensure that the buffer is always maintained at a reasonable level to prevent interruption to smooth play-back, whilst avoiding the discarding of too much data if the session is ended prematurely & intentionally by the user, for instance.

A conventional HLS server is usually a standard HTTP server, and is programmed to grant HTTP access to a client device, which in turn is arranged to data from the server in a fast as possible manner. The sending or transmitting speed is determined by the network conditions only and, neither the server nor the client has any control of the network speed or the quality of the video. As no changes are made to the existing server side systems that implement convention HLS, all data flow control modes of the present embodiment are only performed at the client to improve conventional HLS and control the transport of the TS-segments.

The Speed-up mode of the first embodiment of data flow control according to the present invention utilises four additional mechanisms or strategies to enable it to pull more data from the server than in a conventional HLS system.

5.1.1.1 Overlap-Download

Figure 1A:
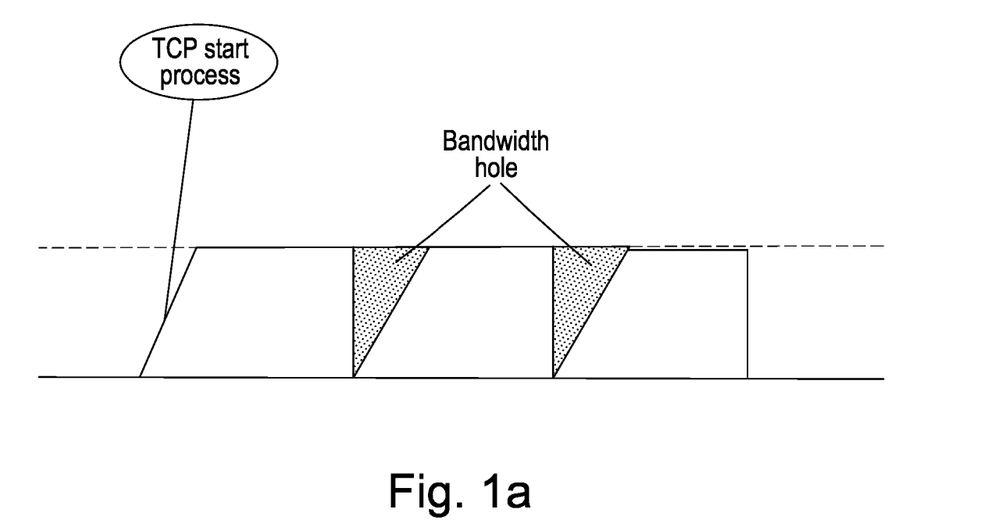
FIG. 1*a* shows a download mechanism used in conventional HLS systems.

Conventional HLS systems and protocols will start to download the next TS segment only if the previous TS segment has been completely downloaded. This action introduces a short empty bandwidth window in which there is very little or no data transmission. This window is shown in FIG. 1a relating to conventional HLS. This window or bandwidth hole results in a waste of a bandwidth as well as time. To address this bandwidth/time wastage issue, the speed-up mode of the present invention incorporates a mechanism referred to herein as overlap-download mechanism. This mechanism is shown in FIG. 1b.

Figure 1B:
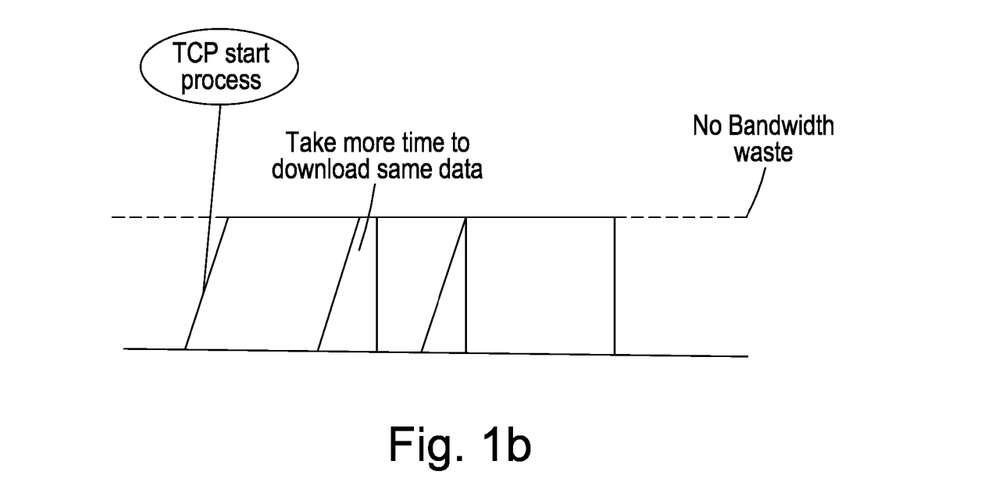
FIG. 1*b* shows overlap-download mechanism of the data flow control method of the present invention, according to a first embodiment in a speed-up mode.

By making using of this, the client device can utilize empty bandwidth slots as shown FIG. 1b. The overlap-download mechanism of the present embodiment proposes a method or algorithm that is configured to enable the client device which implements the data flow control according to the present invention to start to download the first received TS segment as normal, but starts the second TS segment download when the first TS segment progress reaches 80%. By starting the 2nd TS segment earlier, it allows overlap of the previous download process which utilizes all of the available bandwidth gaps outlined previously. An example of recommended TS segment time is about 10 seconds, but this can also be reduced to smaller values, such as (2-10 seconds). Using smaller TS segments induces more unused bandwidth gaps, but offers a faster start up time as a trade-off.

The overlap-download mechanism of the Speed-up mode provides better use of network bandwidth and increased network performance.

5.1.1.2 Speed-Up in Conjunction with Dynamic-Multi-Links:

The Speed-up mode of the first embodiment also includes a mechanism for establishing multiple TCP connections or links between the Client Player implementing the data flow control according to the present invention, and the HLS server. In this mechanism, the client is configured such that each TCP link downloads one portion of the TS segment. Dynamic-Multi-Links is explained in detail in Section 5.1.4 of this document. This use of multiple TCP links has the effect significantly improves download performance and decreases total download time at the client play if compared to a single TCP link connection. For example, when 1 TCP link is used to download one TS segment at 1 Mbps, 3 seconds are needed to download the first 30% of the data and 10 seconds in total to complete the downloading. However, when 5 links are used at 1.5 Mbps to do the downloading at the client device, the client may require 5 seconds to download the first 30% of the data, but then only need 6.67 seconds or so to completely download the whole TS segment.

5.1.1.3 Auto-Route

The Speed-Up data flow control mode of the first embodiment includes and auto-routing mechanism to improve exiting HLS systems on the client side. This mechanism makes use of Domain Name System (DNS) and by this mechanism the Client Player is configured to can detect HLS server locations, i.e. IP addresses, based on a DNS-resolved IP list. The Client device is configured to probe the network for the HLS http service, http errors and network (RTT) response time, and calculate the distances between servers and itself i.e. the client. By having this information ahead of time, the Client Player is capable of determining an optimal fallback routing table using alternative fallback strategies when necessary.

The auto-routing mechanism of the present embodiment operates such that upon encountering congestion conditions, the Client Player has a random delay time window which allows the client to confirm any errors before abandoning its current data giver, i.e. the current HLS server and auto-routing to the next ideal server. The auto-route fall back mechanism occurs seamlessly such that the end-user does not experience or notice any negative impact on video quality or transmission performance.

This data flow control mechanism has the effect of enhancing the whole HLS delivery system from server to client and also serves to minimise the chances of video buffering over unmanaged networks.

5.1.1.4 Concurrent-Multi-Paths

The Speed-Up data flow control mode of the first embodiment also utilises a mechanism of implementing concurrent paths to a plurality of data givers. This mechanism uses a similar approach to that used by the Auto-Route mechanism in Section 5.1.1.3 but the client player is arranged to use this mechanism when data required to maintain smooth streaming cannot be obtained via a single HLS server, regardless of the number of TCP links that have been established or how many routes have been tried. Through the use of DNS IP resolution and service protocol probing (HTTP service availability, network RTT and distances between servers and client), the concurrent-multi-path mechanism of the present invention is configured to establish for instance, two TCP links to each of the three preferred HLS servers on the fallback routing table. Thus there would be 6 links in total providing data to the client, two from each server. The optimal number of links is 6, but it is possible to have more than 6 links to the client, if it is possible to do so without compromising on network optimum conditions. These servers may be dynamically changing priority position according to each probe update. The probing preferably occurs on a pre-programmed timer and an internal routing table is updated according to recent changes.

This mechanism of the Speed-Up data flow mode ensures that the target HLS server can handle a new request and allows "load-balancing" to be performed between the active servers, when required. The concurrent-multi-path mechanism has the effect of minimizing video buffering 5.1.2 Back Off This back off mechanism of the data flow control method of the first embodiment can be triggered upon detection of congestions/conditions of network at the client device that matches a pre-set back-off criteria. The best way to ease off congestion for IPTV packet data transmissions is to back-off or navigate using one or more different paths to avoid contributing to the existing network congestion and traffic. The back off mode of the data flow control method according to the present invention is triggered when congestion is detected.

There are two logical methods to improve network congestion; one method is to implement a back-off mechanism to yield bandwidth to other traffic or to avoid contributing to the congestion by not being part of it. The back-off mode of the first embodiment is a flow control protocol or method runs on the application layer to co-exist with other traffic flowing in the same pipe or communication channel between the data givers (server) and data receivers (clients).

This mode is triggered when network congestion via the TCP layer is detected. If congestion is present, a pre-set download speed for the client is compared against the TS segment current download speed. This mode is only employed if the local buffer level at the client device is higher than 80%. When this occurs, the data flow control mechanism of the present invention implemented on the client is configured to reduce the data receiving rate at the client to near zero, i.e. a level that is enough to keep the TCP session active. When the receiving buffer is full, the sender will not be able to send more data. At the same time, if the receiving speed on the Client Player is limited to a low level, the HLS server can only send data at the same rate at which the client has been limited to i.e. a choke or cap on the receiving rate.

Without the back-off mode set out above, the HLS system will consume as much bandwidth as the network can offer and takes unnecessary bandwidth at a time when other traffic may desperately need bandwidth resource.

The back-off period i.e. the time for which the client device implements the back-off mode, is preferably 20% of the current local buffer playback duration. When this period expires, the data flow control method of the first embodiment switches to Trickle (set out in Section 5.1.3) or Speed-Up mode (Section 5.1.1), depending on the total TS segments available on the HLS server.

For example, if the session is a movie, for which all of the TS segments are already on the server, the data flow control mechanism of the present embodiment will transit to Trickle or Speed-Up mode according to data download requirements. If the session is Live TV, for which the server has only a limited number of new TS segments generated for a short time, the data flow control mechanism will switch directly to the Speed-up mode.

The back-off mode of the present invention is programmed to use only 1 TCP link to request the TS segments. During this time, the back-off mode operates such that only 10% of the TS segment data is requested for each transmission. This 10% is a preventative measure to prevent the whole TS segment being locked into one TCP link. Should the network conditions change and this is detected by the client device, the data flow control method of the present invention will switch to other modes and use multiple-links from a single or multiple HLS servers to download the rest of the TS segment effectively.

5.1.3 Trickle Mode

The trickle mode of the data flow control method according to the first embodiment is triggered or applied when the cache buffer on the client terminal is at the safe level (80% or more of the buffer). In the trickle mode, the data flow control method of the first embodiment is configured to cap the receiving speed of the client device to the same speed as the video bitrate. This mode triggers when the local buffer is 80% or above and is applied such that the total speed is dynamically capped across all connected TCP links, regardless if they are coming from one or multiple HLS servers.

During the trickle mode, only two active TCP links are maintained and the client is configured to receive the data as the rate for which real time playback is required. When two active TCP links are used for data delivery in this mode, each link requests a portion of the data for the new TS segment. This portion or part pPartPerLink requested by each link may be, for example, a 25% portion of the data for the new TS segment (25%×2). In this example, the other 50% begins when the first portion has been downloaded. In some cases, there might already be more than two TCP link established to the servers, in which case data flow control method will function to maintain the other links and keep them as standby links, which may then be used for redundancy or emergency purposes.

The process followed in the Trickle mode is set out below:
1. Flag the standby observing time window as sOvserveTime seconds, which is represented as being equal to EXT-X-TARGETDURATION (as defined in the known HLS "Pantos" Specification). The EXT-X-TARGETDURATION tag specifies the maximum media segment duration. This tag appears once in a media playlist file and applies to the entire playlist file.
2. If the data flow control mode is still in Trickle mode after sObservTime time, the data flow control method of the present invention will place 1 active TCP link on standby.
3. The system will continue to measure the streaming mode for every sObservTime time window. If Trickle mode can be sustained, then the data flow control method will continue to reduce active TCP links, at a rate of one per sObservTime time window.
4. The data flow control method will stop downsizing if the total active TCP links equals 2.
5. The total TCP links are considered as TCP connections that are made to one or multiple HLS servers.

Figure 2:
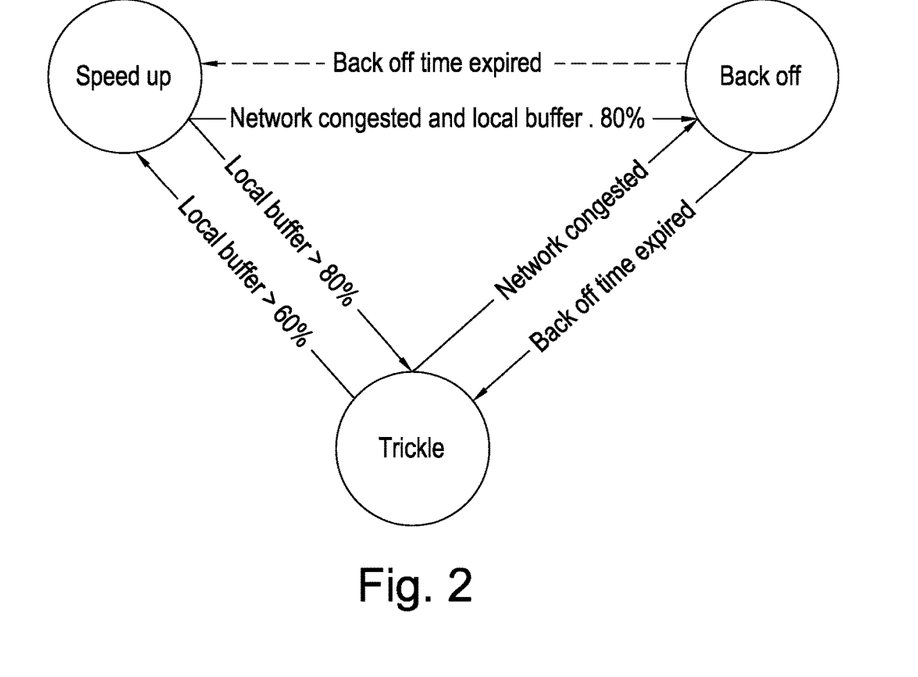
FIG. 2 shows the interaction of speed-up, back-off and trickle modes of the data flow control method of the present invention according to a first embodiment.

The transition process and interaction between the Speed-Up, Back-Off and Trickle download modes for the client device is seen in FIG. 2. During movie playback sessions, the data flow control method of the first embodiment uses client device buffer levels to determine the transition between the different modes. If the level of the local buffer is more than 80% and the network is congested, the flow control will switch back-off mode. If local buffer is more than 80% and the network is not congested, the flow control method will switch to Trickle mode. If the buffer level falls below 60% during Trickle mode, the flow control method will switch to Speed-Up mode. The co-existence of these modes is seen in FIG. 2.

During a Live TV playback session, a local buffer and TS segment count can be used in the m3u8 index file to determine the transition between these modes. In HLS Live TV streaming, there is no end point in the m3u8 index file, and there are only specific quantity TS segments available for a given time period. When the client player downloads all the available TS segments listed on the m3u8 index file, the data flow control method will switch to Trickle Mode to begin the download of the next real time segment as the m3u8 index file grows.

5.1.4 Dynamic Multiple Link Mechanism by File Offset

Multiple TCP links play a very important role within the data flow control method of the present embodiment for HLS. Multiple TCP links achieve extra TCP resources and speed up the data transmission between HLS server and Client Player. In one aspect, the flow control method of the present invention proposes a dynamic multiple links mode of operation which adjusts the quantity of TCP links to best suit the current network condition at any given time. Too many TCP links can create more overheads and would be self-competing in a limited network. Too few TCP links offer no benefit for concurrent processes and could lead to undesirable results. The preferred maximum number of TCP links is limited to 6 for data flow control method of the present invention. However, it is possible to have more than 6 links.

Figure 3:
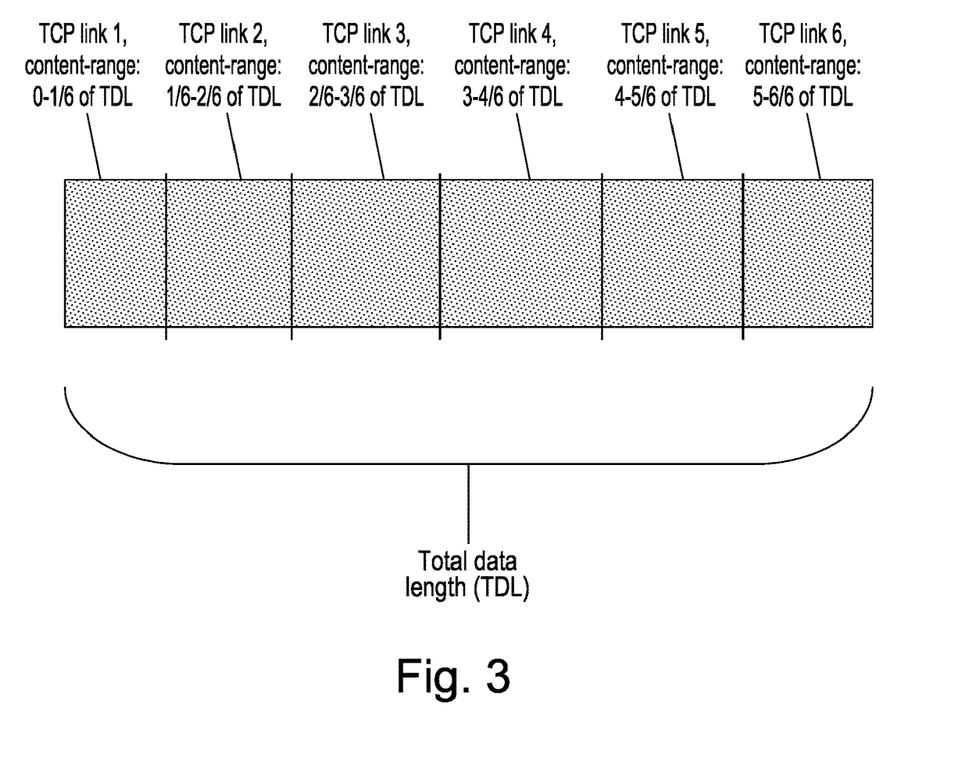
FIG. 3 shows a header content range request for obtaining the size of a TS segment.

Existing HLS servers are only aware of standard HTTP requests and will only grant access to valid http requests, assuming that the TCP session is tasked with ensuring data is aligned at the client side. Thus one of the main challenges with using multiple links is to handle data which is generally not received in a sequential order. Dealing with this challenge in real-time add a new level of complexity for the Client Player. The data flow control method of the present embodiment includes a mechanism that is capable of guaranteeing that specific data will come from a specific TCP link. This mechanism is done by utilizing the HTTP request header Content-Range, as shown in FIG. 3 of the accompanying drawings.

Although different parts of the data can be obtained by utilizing the specific HTTP request header, it is necessary to obtain the total size of the TS segment ahead of time before multiple TCP links can be created. A dynamic-multiple links mechanism of the data flow control method of the present invention utilises the HTTP HEAD request feature, which enables the flow control mechanism to gather information by asking the HLS (HTTP) server for meta-information about the requested resource (the TS segments media info). The HEAD response includes Content-Length, which is a header field that informs the client the total size of the TS segment. The HEAD response does not include the message body (the TS segment itself), which saves network bandwidth whilst at the same time providing the Client Player with the total data size before download can be initiated. HEAD request is essential to the dynamic multiple links mode of operation of the flow control method for HLS systems, without which multiple links would be impractical to implement. HTTP HEAD request is supported in both HTTP 1.0 and HTTP 1.1 standards.

The new tag EXT-X-BYTERANGE (defined in the HLS "Pantos" specification, to indicate that a media segment is a sub-range of the resource identified by its media URI) can be replaced with HTTP HEAD for both Video On Demand & Live TV playback, if it is present on the m3u8 index file. This new tag informs the client player which part should be requested from the HLS server for the new TS segment. Thus, the use of HTTP HEAD is to address HLS backwards compatibility issues where older HLS versions do not support EXT-X-BYTERANGE.

A further method to obtain the TS segment size information from HLS server is also set out in the dynamic multiple link mode of the present embodiment. One TS package is 188 bytes in general, thus the minimum of one TS segment is 188 bytes. Before requesting the left data, the data flow control method of the present invention includes requesting the first 188 bytes from the target TS segment. According to the HTTP standard, the HLS servers will return the total length of the target TS segment when it sends response to our 188 bytes data request. This is also achieved by the Content-Range response header.

The Dynamic Multiple Links mode of the data flow control method, according to the first embodiment defined by the algorithm below:

Definitions

Open TCP link: TCP connection has been established. The link could either have data flow or not.
Active TCP link: Open TCP link that has data flow on it.
Standby TCP link: Open TCP link that has no data flow on it.

Figure 4:
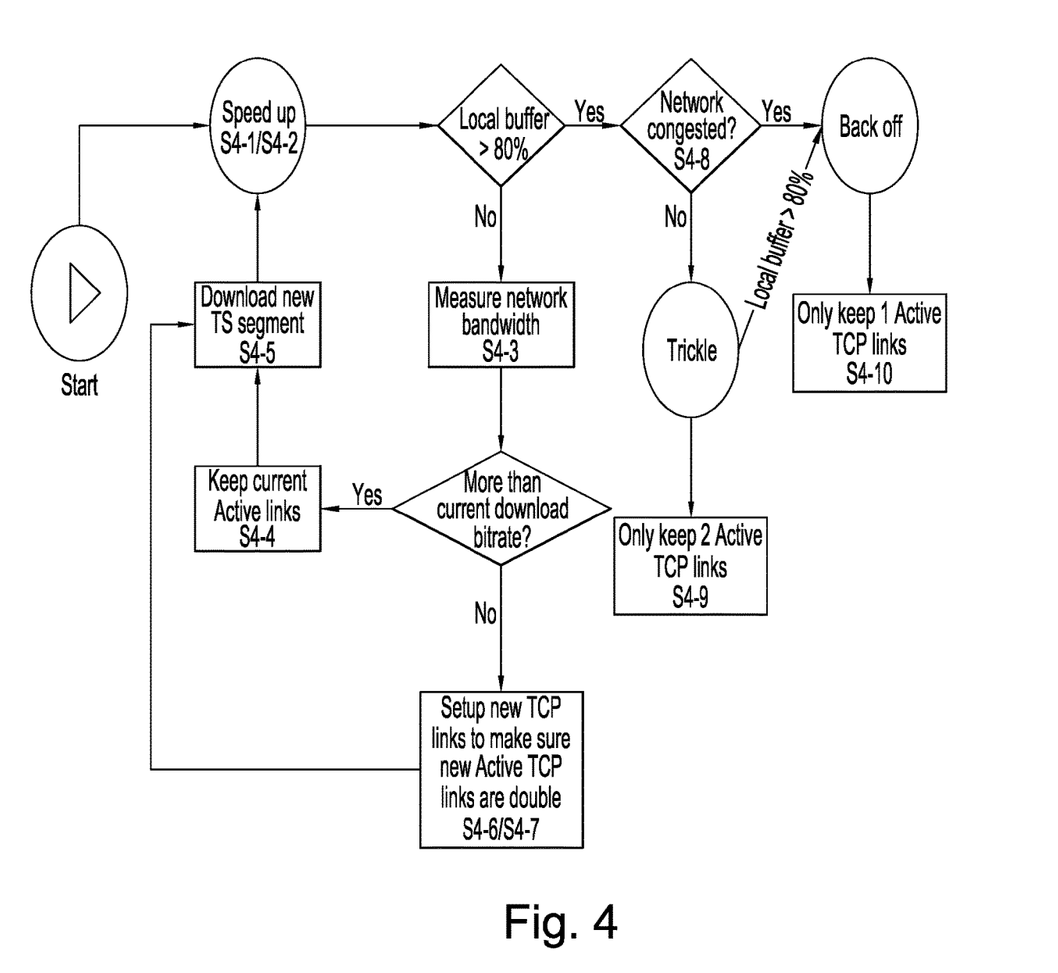
FIG. 4 is a flow diagram showing the operation of dynamic-multiple links mode of the data flow control method of the present invention.

The algorithm is also shown in FIG. 4 of the accompanying figures, which shows some of the following steps:

S4-1. Set the total maximum Open TCP link number nMaxOpenTCPLinks as 6. 6 is a good assumption and preferred value for the number of HTTP concurrent persistent connections supported by the HLS server and is also preconfigured by most current web browsers.

The maximum number of Open TCP Links per TS segment is derived from the value of EXT-X-TARGETDURATION. A minimum of 2 TCP open links are used to guarantee the overlap-download strategy can be safely employed.

S4-2. Based on the maximum number of open TCP links nMaxOpenTCPLinks, the optimized download percentage for one TS segment per Active TCP link can be obtained.

S4-3. Set available bandwidth measurement duration as 3 second. 3 seconds is used as a reasonable duration in which to measure the current available bandwidth. The action of creating any new TCP link or placing existing TCP links into standby is based on the observed results for this duration.

S4-4. For the first segment, one Active TCP link is used to download the top 50% of data. This provides sufficient time to measure the available bandwidth resource before starting to download the bottom 50% of the data, once the previous download process has completed 80% (equal to 40% of the TS segment data). This is also called overlap-download. If the bandwidth is sufficient to support the current bit rate level, when the first TCP link completes its download task, will not be reused until the next overlap-download time window. Now there are two Open TCP links, but only one active TCP link.

S4-5. Alternatively, if the bandwidth is not sufficient, the first Open TCP link will be reused again immediately to download the next new TS segment, after it completes its current downloading tasks. This provides an opportunity to acquire more bandwidth by utilizing two Active TCP links. If there is sufficient bandwidth to utilize two Active TCP links, the data flow control method of the present invention will keep them open and active.

S4-6. If two Active TCP links cannot acquire sufficient network bandwidth to get the data in time (download speed over two links is less than the bit rate of the current TS segment), the data flow control method of the present invention creates two new TCP links for the left part of current TS segment or next new TS segment so that there are four Active TCP links to download the data. If the download speed over four TCP links is more than the bit rate of the current TS segment, the dynamic multiple link flow control method will keep them all active until Trickle or back-off flow control modes described above mode is selected.

S4-7. Alternatively, the data flow control method of the invention includes creating 2 more new TCP links so that six active TCP links are available to download the data. The flow control method will continue to increase new TCP links if there is insufficient bandwidth resource across all current Active TCP links, but also ensure that the limit of maximum TCP open links is not exceeded regardless of whether or not the acquired bandwidth is sufficient TCP links is enough or not. If the maximum number of active TCP links cannot provide enough network speed, it is assumed that there is some physical limitation along the network path, and the flow control method uses the multi-route mechanism and auto failover to search for alternative physical network paths to other ideal HLS servers.

S4-8. Under the above circumstances, the data flow control method will keep open the multiple TCP links until Trickle or Back-off mode is selected.

S4-9. In Trickle mode, the data flow control method monitors the network bandwidth consumed prior to placing the Active TCP Links into standby, and if the speed over all available TCP links is more than the bandwidth value of the TS segment variant, the flow control mode will place into standby two Active TCP links per period of available bandwidth measurement duration. If the speed is insufficient, the data flow control method will leave will leave the links active until the above condition has been met. The method will always keep at least two links active during this mode.

S4-10. In the back-off mode, the data flow control method only keeps one active TCP link. Other links are set to standby, remaining ready for a rapid mode change to re-establish new links if required.

5.1.5 Auto-Routes Modes (by DNS Resolving Technique)

The Auto-routes mode of the data flow control method of the present invention is a technique which intelligently guides the Client Player to fallback or failover to a different HLS server if the streaming session to the first HLS server encounters technical issues. This feature requires the use of DNS systems. This feature was introduced briefly in the Speed up mode as one of the available mechanism for entering the speed-up mode in Section 5.1.1.4.

Standard HLS format includes streaming guidance via an m3u8 index file (playlist). There are URIs within the content of the file to indicate the resource identifier of the TS segment. These URIs are either provided as an absolute URI, or a relative URI based on the URL of the m3u8 file itself. The URI is normally formatted by using a FQDN (fully qualified domain name) but some HLS deployments use an IP address instead. When using a FQDN, the Client Player will need to resolve it to an IP address before connecting to the HLS (HTTP) server.

Initially, the auto-route mode of the present invention uses a standard DNS query to get all available "A" type resource records (RRs) as an IP list. A pre-condition of the system configuration is that each URI contains the hosts IP list and that all host HLS servers must guarantee that their content is identical. Equipped with this information ahead of time, the flow control mechanism can now manage multiple hosts that were obtained from the DNS query.

The auto-routes mode could be activated for one of two purposes; either to enable seamless re-routing (fallback) when the current HLS server is not able to supply service, or is overloaded (a server issue); or, to pull data from another host(s), which could possibly be on a different physical network path if the data flow control method of the present invention detects that the path to the current server is congested (a network issue).

Seamless re-routing is achieved by simply switching the connection from the current server to another server with a different IP that is resolved to the same target domain name. Therefore if the current server is down, the connection times-out, or is not able to supply the requested resources (m3u8/TS segment) due to similar errors, the data flow control method i.e. auto-route mode, will switch servers and resend the request to the new server. The auto-route mode of the data flow control method will know exactly which part of data is needed before it performs the server switch, so the mode can request the next part of data by utilizing the HTTP request header 'Content-Range'. This process is seamless to the client player and does not have any impact on video quality or continuous smooth playback.

The second purpose of this is to work in conjunction with the above described dynamic-multiple links mode described previously in section 5.1.4 and FIG. 4. When in the speed-up mode, the data flow control method attempts to get data as fast as possible to fill the local buffer, but there are two scenario in which dynamic multiple links mode may be is unable to yield good results:

Scenario 1—If congestion occurs on the server side, and no matter how many TCP links are opened, the dynamic multiple links mode may be unable to get enough bandwidth to supply smooth playback (server bandwidth and server I/O performance issue).

Scenario 2—If congestion occurs in network equipment on the current network path which offers no alternative routes.

Figure 5:
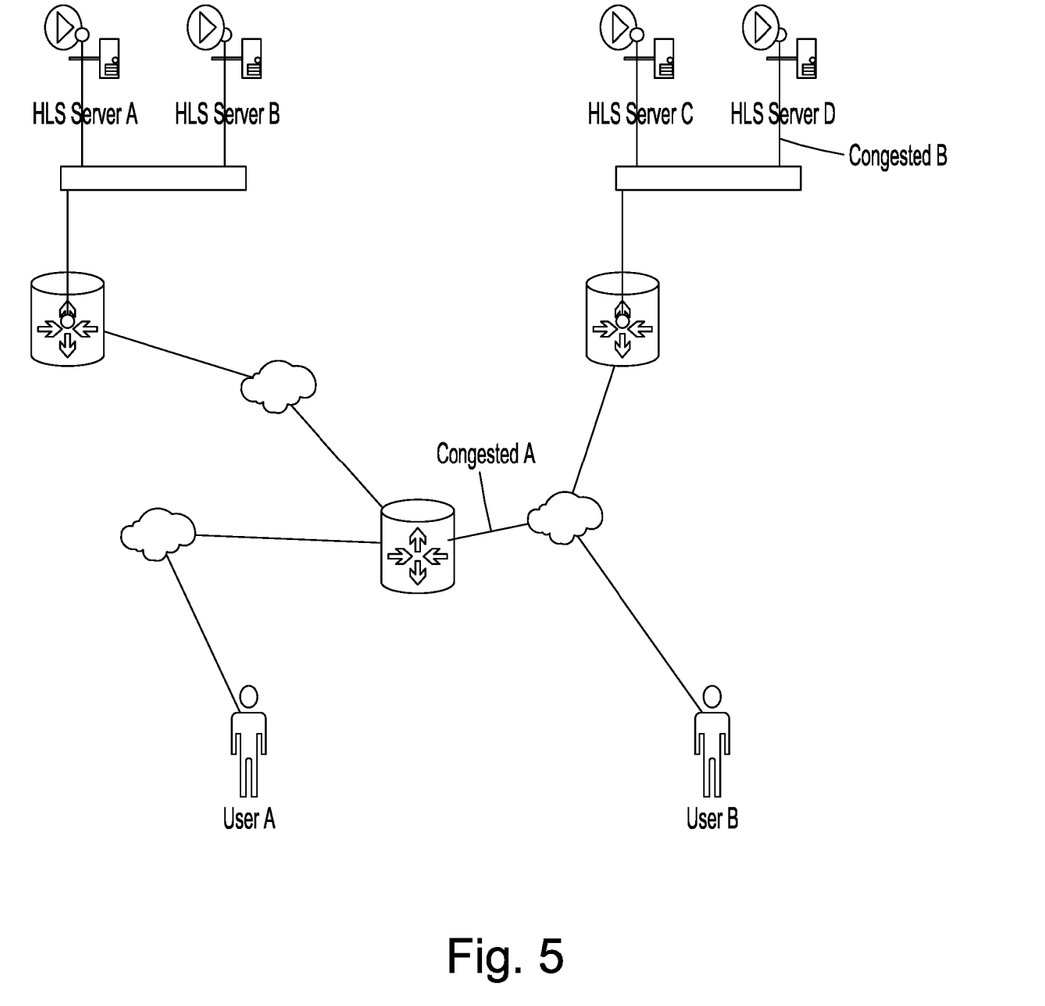
FIG. 5 shows two types of congestion occurrences in HLS systems

FIG. 5 of the accompanying drawings shows the 2 types of congestion scenarios.

In the above scenarios and with reference to FIG. 5, suppose User A is pulling data from HLS server C, and User B is pulling data from HLS Server D. Congestion point A is a network path congestion, whereas congestion point B is a server side congestion. If point A is congested, User A should get new data from HLS server A or B in order to avoid playback failure or introduce even more congestion to the current path at point A. Whereas User B can just switch from HLS server D to HLS server C to avoid the overload of HLS server D so that he/she can get smooth data from HLS server C.

It is not possible to identify which type of congestion is occurring without some necessary information exchange with the HLS server. Standard HLS servers do not exchange any information about the network/host with the client, so the client device or player needs to find another server no matter what type of congestion has occurred.

A feature of the data flow control mechanisms of the present invention is to provide the client device with the ability to know if congestion exists. This is achieved by using the measured bandwidth and dynamic multiple-link mode to identify congestion conditions existing on the current network path under the following conditions:

1. 30 seconds have passed since start up.
2. A maximum number of Open TCP links, i.e. nMaxOpenTCPLinks, has been opened to the current HLS server 3. Sufficient bandwidth resource still cannot be obtained to fill the local buffer by utilizing the Open TCP links for random time slots from 5 to 15 seconds for observing windows.

If the congestion is identified, the auto-route mode of the flow control method is capable of seamlessly switching the client player to another HLS host. This mode introduces a random delay (waiting) time window for each connected Client Player to allow them to probe for bandwidth improvement. This method also prevents all clients from leaving a server at the same time if congestion detected, which could simply cause congestion elsewhere.

However, there is also the possibility that a player cannot get sufficient bandwidth from a single HLS server, in which case the data flow control mechanism will switch to the Concurrent-Multi-Path mode described below in Section 5.1.6 to pull data concurrently from multiple HLS servers.

The auto-route mode of the present invention strategy is most effective in the Speed-Up mode as set in item 5.1.1 above. In Trickle and Back-Off modes the data flow control method according to the present invention will reduce active TCP links which could be on different network path.

5.1.6 Concurrent-Multi-Path Mode

The concurrent multi-path mode of the data flow control method operates as follows:

The max number of concurrent servers is equal to nMaxOpenTCPLinks

The max total TCP link for all active concurrent servers is also nMaxOpenTCPLinks The minimum download unit percent from the server is equal to 100*(1/nMaxOpenTCPLinks) %

This is because the nature of HLS TS segment download is selective, which means a specific part of the data must come from a specific server/link. The following process shows how multiple paths can be download concurrently using the concurrent multi path mode of the present embodiment.

1. Set a flag IPnr as the quantity of the IP resolved to the same target domain name
2. If IPnr<2, then this mode cannot be used.
3. Else if IPnr<3, then distribute the maximum number of open TCP links to the 2 hosts. That is 3 Active TCP links for each of the hosts.
4. Alternatively, distribute the maximum number of open Active TCP links to top 3 hosts on the IP lists. That is 2 Active TCP links for each host. The top 3 hosts are determined by the following conditions:
  Less Round Trip Time value among all the hosts in the IP list. This can be tested by utilizing the HTTP HEAD command that is used to get the resource Meta data information.
  Short Geo-Location distance. The geo-location information is fetched by utilizing one world IP-Geo-Location database. This database can be network based or local based if the client is preconfigured to be used only in the authorized area.
  The requested resource is normally operational on the host including HTTP service.
  This is also detected by utilize HTTP HEAD command.
  The download unit percent from the server is equal to: 100*1/nMaxOpenTCPLinks %

The top 3 hosts in the IP list are dynamically updated based on predefined timer. The concurrent multi-path mode of the data flow control method of the present invention uses 10 minutes as the probing interval.

The Concurrent-Multi-Path mode will not be able to be used in the data flow control methods of the present invention if there is only one IP that is resolved to the target domain name or the m3u8/TS segment is identified by IP instead of domain name.

5.1.7 Authorized Data Recycling & Sharing

Data recycling is a feature that can be included in the data flow control methods of the first embodiment of present invention for allowing a user to reuse as much of the previously downloaded data as possible and share this amongst authorized devices within the same home or trusted network. Nowadays, media streaming devices usually have large SSD internal storage (8 to 250 GB). Through an application interface, a user can decide in advance whether or not to reserve the storage space required for the HLS data flow or simply turn off the feature by setting the storage to 0 GB.

Once a storage limit is set, the flow control method collects data that has been passed through the client player and keep it in the order in which it was received, along with DRM information for further sharing purposes. The data collection process overwrites new data over the old data in such a fashion that the reserved storage space never runs out. The flow control methods and for data recycling and sharing is equipped with an index file to track the TS segments stored on the local storage, i.e. the client, for easy querying. This feature is only effective for Movies or Replay TV and can offer an instantaneous movie start if the content is found on the local device. The stored data information can also be shared or updated across similar applications in authorized devices the same type found on the local network, so that other authorized users can view the same content on another authorized device without consuming any further WAN data.

5.2. Second Embodiment

The Second embodiment of the data flow control method of the present invention includes modes and mechanisms for Video Quality Control to ensure that the highest quality of video data is provided to IPTV end users. These mechanisms are explained below:

5.2.1 Adaptive Bitrate Streaming for High Quality Video

The adaptive streaming in the second embodiment is a technique used in streaming multimedia over computer networks and functions by detecting a user's bandwidth and CPU capacity in real time, and adjusting the quality of a video stream accordingly. Conventional HLS supports adaptive bit rate quality control. The standard method is to adjust request bit rates based on the current monitored bandwidth. The method ensures that a request for a specific TS segment has lower bit rate than the monitored bandwidth. So, even if there is sufficient head room on the network path, HLS does not use that available higher bit rate for the TS request. This is one of drawbacks of standard HLS player and will is addressed by the data flow control method of the present invention according to the second embodiment.

Adaptive bit rate streaming requires the use of an encoder which can encode a single source video at multiple bit rates. The player client switches between streaming the different encodings depending on available resources. This results in very little buffering, fast start time and a good experience for both high-end and low-end connections. This well-known method is adopted by most known streaming technologies and is widely deployed. The adaptive bitrate streaming in this embodiment uses the same approach but enhances it with a slightly different concept of the switching conditions.

Conventional HLS players switch to a bitrate that is a little lower than the current download speed. This could lead to a rapid fluctuation of video quality if the network is hostile and spiky. For example—Consider a user is trying to watch a Movie that is encoded in 5 different bitrates (500 kbps, 1 Mbps, 1.5 Mbps, 2.0 Mbps, and 2.5 Mbps) and the client player is currently streaming at 2.5 Mbps. If within 30 seconds the Internet fluctuates and only yields a speed of 650 kbps, a Standard HLS player will downgrade the stream by playing 500 Kbps, which represents a big difference in video quality, causing a poor user viewing experience.

In the present invention, the adaptive bitrate mode of the data flow control method switches the bitrate up or down sequentially, i.e. in a step by step manner without rising or fall to the highest or lowest bitrate possible in a single step, thereby being capable of offering a smoother switching of bitrates and maintaining a similar user experience, unless the buffer of the client player cannot cope with the network condition. In this case, the adaptive bitrate mode will fall back to the standard method, but providing priority to smooth playback. The sequential rising or fall in the bitrate is according to the different encoding rates of the data being received at the receiving node.

5.2.2 Quality Greedy Mode

Smoothness and video quality are most important factor for a high quality user experience. Whilst adaptive bitrate mode of the present embodiment in Section 5.2.2 attempts to resolve smoothness issue, the quality greedy mode of the data flow control method according to the present invention attempts to address the quality issue from a different aspect of adaptive bit rate application. The effect of this mode is to request higher bit rate level TS segment as long as we can guarantee smooth playback. Thus, this mode not only takes the network condition into consideration, but also evaluates the smooth playback before the next new TS segment is requested.

Figure 6:
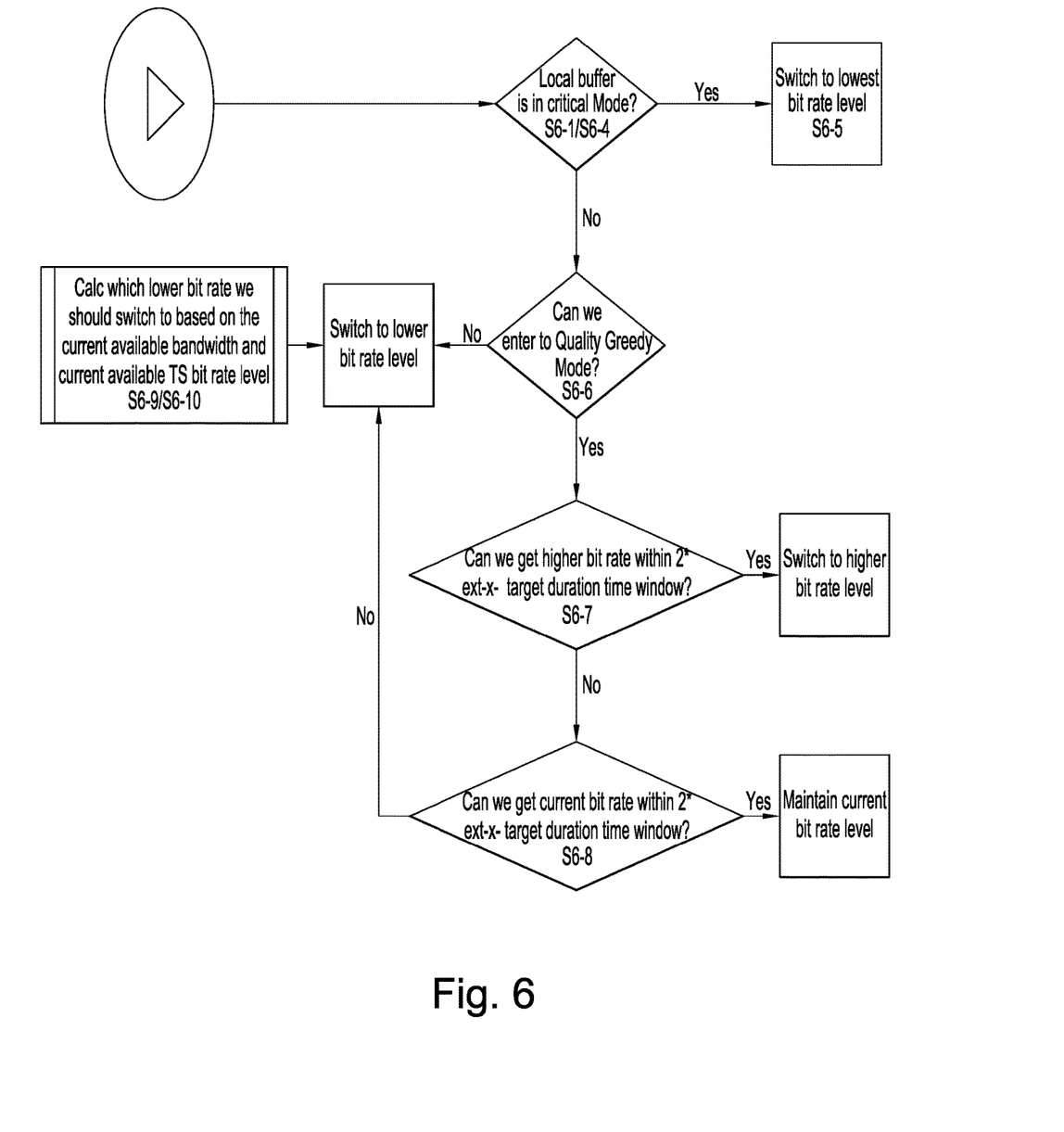
FIG. 6 is a flow diagram showing the operation of the quality-greedy mode of the data flow control method of the present invention in accordance with the second embodiment.

Quality Greedy Algorithm as shown in FIG. 6 is set out below:

S6-1. Suppose the current download bit rate level is cTSSegKbps, the next highest bit rate is nHigherTSKbps and the previous lowest bit rate is pLowerTSKbps S6-2. The bit rate values can be obtained from the master m3u8 index file. So that we can form the following bit rate relationship:

$$cTSSegKbps = x * pLowerTSKbps$$

$$nHigherTSKbps = y * cTSSegKbps$$

$$\forall m \in \{x,y\}: m > 1$$

S6-3. During the playback session, the available bandwidth is continuously monitored and flagged as abwKbps, he current local buffer cached TS segment number is flagged as nCacheTSSeg and the playback duration of the current buffer data is flagged as tCacheTS seconds.

S6-4. The flow control method only switches the bit rate level for the next new TS segment based on an HLS native limitation in which there is no way to know the file offset of aligned IDR (Instantaneous Decoder Refresh) frame for different bit rate levels in the middle of a TS segment without actually download it and parse it.

S6-5. If the following condition occurs:

$$uCacheTSSeg <= 1 \text{ and } tCacheTS <= 10 \text{ and}$$
$$abwKbps < cTSSegKbps * 1.5$$

The data flow control method of the present invention will switch to the lowest bit rate level immediately for the next TS download. This is for emergency situations for which video smoothness is the first priority.

S6-6. If the following occurs:

$$nCacheTSSeg >= 3 \text{ and } tCacheTS >= 20,$$

the data flow control method of the present embodiment will enter the Quality Greedy to enable the client device to
a) Request higher bit rate level as long as network condition is good
b) Maintain current bit rate level although network condition is not so good
c) Request higher bit rate level instead of the suggested bit rate level although the network becomes bad S6-7. If abwKbps>=nHigherTSKbps, Q-FLOW HLS will request the next TS segment at bit rate nHigherTSKbps which follows normal conventional HLS strategy. The Quality greedy mode also allow the data flow control method to request the next TS segment at nHigherTSKbps bit rate as long as any of the following condition are met:

$$abwKbps >= cTSSegKbps_i, y <= 2 \quad \text{a)}$$

$$abwKbps >= cTSSegKbps * (y-1)_i, y > 2 \quad \text{b)}$$

The above relationship between bandwidth and new bit rate quality could guarantee there is at least 1 segment in the local buffer after the new TS segment is fully downloaded.

S6-8. Or else the Quality greedy mode allows us to maintain the current bit rate (cTSSegKbps) as long as any of the following conditions are met:

$$abwKbps > pLowerKbps \text{ If } x <= 2 \quad \text{a)}$$

$$abwKbps > cTSSegKbps/2 \text{ and } x > 2 \quad \text{b)}$$

This relationship guarantees that the next TS segment can be fully downloaded within EXT-X-TARGETDURATION*2 time window so that there is still at least 1 segment in the local buffer cache.

S6-9. Or else, the data flow control method is aware that that the network condition becomes bad enough to cause a switch to a lower bit rate. The Quality-greedy mode does not simply switch to a suggested bit rate that is lower than abwKbps, instead, it is checked whether or not the bit rate that is one level higher than the suggested bit rate in the EXT-X-TARGETDURATION*2 time windows can be downloaded.

If possible, the higher bit rate is downloaded by the client player rather than the suggested bit rate. If not, the suggested bit rate is used.

S6-10. Or else, if nCacheTSSeg<3 or tCacheTS<20 the data flow control method will exit quality greedy mode and enter the conventional HLS adaptive bit rate switching policy to determine if we should request higher bit rate level or request lower bit rate.

5.2.3 Smart Pre-Buffer Mode to Get the First 10 Second TS Segment

The data flow control method according to the present invention provides a smart pre-buffer mode to improve the playback start-up time at the client device. A conventional HLS player will playback the content immediately after it gets the TS segment. However, in the present mode, the flow control method divides this into two phases—Firstly download the data on to the player, and then secondly playback the data and download the next piece of data.

During the first phase, the data flow control method downloads the data but does not playback, irrespective of how quickly we receive the data. This provides an opportunity to control when to enter the first phase. For example, during a movie playback session, the first phase can be entered after the user selects a movie poster but before he/she clicks 'PLAY' button. This could possibly provide 2 or 3 seconds to download the data before the secondary playback phase.

The second phase as described above is actually playback. After the user selects the 'PLAY' button, the data flow control method can start playback immediately, provided there is enough data downloaded in the first pre-buffer phase. This provides the user instant start-up of video playback. Even if the first pre-buffer phase doesn't download enough data to start the playback right away, it still can get more data than the normal playback process.

For bandwidth consumption considerations, the pre-buffer mode can limit how much data can be downloaded in the first pre-buffer phase or decide if the feature should be enabled for use over wireless mobile networks. This feature offers to pre-buffer the first 10 seconds of new releases or even make some predictions on which type of movie the user would like to watch and pre-buffer these. Once a movie is pre-buffered and placed in the local cache, start-up is virtually instantaneous being achieved in less than 200 ms.

5.2.4 Start Bitrate Selection Mode

The data flow control mechanism of the present invention proposes a selection mode for selecting the start bit rate. There are two standard ways to select the start-up bit rate. The first is to choose the lowest level and the other is to choose the highest level.

The lowest one first option can result in the smoothest playback experience because this will enable the data flow control method to learn about the network condition by monitoring the download process. The selection mode only selects higher bit rates when the network condition allows. However, the end user endures low video quality for the start-up process.

The highest one first option, selects the highest bit rate to start. If the data flow control method identifies that the network is unable to support it, the selection mode will switch to a lower bit rate. This could result in the best video quality for the start process, but only if the network is good enough. However, if using the public Internet, this option can suffer poor user experience through buffering and long loading/start-up time issues.

Thus the start bit rate selection mode takes the middle way. Combined with a data recycling strategy, if the client device has cached the first TS segment, the selection mode proposed by the present invention requests the second TS segment at the second highest bit rate, which is one level higher than the lowest bit rate level. If there is no local cache, the selection mode of the present invention will request the lowest bit rate as the first download TS segment.

5.2.5 Fast Motion Picture Priority Policy

Video encoding can have different modes and filters to enhance video quality. The data flow control method according to the present invention provides a mechanism or policy for dealing with high motion picture frames to enhance viewing experience, provide the highest viewing quality and efficient manage network resources.

In order to get better video quality, an encoder increases the bit rate for fast or high motion video, which is called Variable Bit Rate encoding or (VBR). Similarly, a lower bit rate is used for the slow motion or static videos. If this is not taken into consideration, fast motion videos are likely to increase a pre-determined bandwidth parameter in a master play list file. With VBR encoding, the bandwidth value could be much higher than the average bandwidth value. Conventional HLS players only request the TS segments having a bandwidth value that is less that the current network's available bandwidth. This could cause a poor viewing experience to the end user under limited bandwidth.

Therefore, the data flow control mechanism of the present invention implements a fast motion video first or fast motion video priority mode to gain a better viewing experience under limited network conditions. For a given bandwidth value, the part of data is considered as fast motion video if that part has a bit rate that is 80% or a higher percentage of the bandwidth value. Slow Motion Picture parts are those parts at a 50% lower bit rate percentage when compare to the bandwidth value For HLS, this part of the data is the TS segment, so that if the current stream has a predetermined bandwidth of x kbps, and if the average bit rate of one TS segment is more than 80%*x kbps, then the flow control method identifies that TS segment as containing fast motion video. Alternatively, if the average bit rate of one TS segment is less than 50%*x kbps, then that TS segment as containing slow motion picture.

The average bit rate of the TS segment can be obtained by using its file size and duration:

$$\text{avg}Br = TS\text{Size}/TS\text{Duration} * 8/1000 \text{ kbps}.$$

The file size can be obtained from the m3u8 index file if the server supplies it, but if it is not in the index file, it can be obtained by using an HTTP HEAD request to retrieve the value. The TS duration can then be received from the EXT-INF tag (defined in HLS "Pantos" specification to specify the duration of a media segment).

The advantage of the fast motion video mode is to save bandwidth resource by switching to a lower bit rate in order to get a higher bit rate TS segment, if that segment contains fast motion video. The basic assumption is that if the picture is slow motion, one step lower bit rate data can also give the user acceptable quality.

This mode is mostly effective when we data flow control is operating in the Speed-up mode in Section 5.1.1. The steps of operation of this mode can be described by 1 Suppose the current download bit rate level is cVideoKbps; the next new TS segment in this bit rate level has an average bit rate of nAvgTSKbps, and the next TS segment after this next TS segment in this bit rate level has an average bit rate of nnAvgTSKbps. The current available bandwidth can be flagged as abwKbps.

2. If nAvgTSKbps<50%*cVideoKbps and abwKbps<nnAvgTSKbps, then the fast motion picture mode will switch to a one step lower bit rate for the next new TS segment. After downloading the TS, the data flow control method will resume the download bit rate to cVideoKbps so that we can download the TS segment with a bit rate of nnAvgTSKbps.

3. But if nAvgTSKbps<50%*cVideoKbps and abwKbps>=nnAvgTSKbps the data flow control method will not switch to lower bit rate level because it is possible to download the high motion picture TS segment without network bandwidth issue.

4. Or else, if the next TS segment is not a slow motion picture, the data flow control method will not apply the switch.

The high motion video first mode is only effective for VBR (Variable Bit Rate) or ABR (Average Bit Rate), but may not help for CBR (Constant Bit Rate) as the fast motion data in CBR mode does not have a bigger bit rate when compared to other parts of the data.

5.2.7 Re-segmenting Mode

The TS segment duration impacts two areas: one is the signal delay for live TV playback; the other is playback start-up time. The recommended TS segment duration is 10 seconds and according to the HLS "Pantos" standard, the client player should not play starts less than three target durations from the end of the Playlist file. These conditions result in more delay for live TV and more loading time before start-up for the playback session.

The data flow control method according to the present invention proposes a re-segmenting mechanism for re-segmenting the 10 seconds TS segments into smaller TS segments to allow fast start-up and low delay video playback. If the deployment is already setup with a small TS segment duration, such as less or equal to 3 seconds, the data flow control method will not re-segment it again.

The re-segmenting process of the present embodiment requires that there are multiple GoPs (Group of Picture) in one single TS segment so that it can re-segment the whole TS to smaller TS segment at the start point of the GoP. The small segment TS duration is set to more than 2 seconds. This setting allows the re-segmenting mode to have some time to evaluate the bandwidth condition before the player is triggered to consume the cache TS data. If the bandwidth is good enough, the data flow control method will play the data immediately after 3 small TS segments is received, which could be a possible 6 seconds. Or else, the player has to wait more time to download new TS segment before playing.

By using smaller TS segment, the re-segmenting mode is capable of reducing live TV delay by caching less TS segments before starting to play. Smaller TS segment also provide a fine-grained adaptive bit rate switch control as set out in Section 5.2.2.

While certain embodiments have been described, these embodiments have been presented by way of example only, and are not intended to limit the scope of the invention. Indeed, the novel devices, methods, and products described herein may be embodied in a variety of other forms; furthermore, various omissions, substitutions and changes in the form of the methods and systems described herein may be made without departing from the spirit and scope of the invention. The accompanying claims and their equivalents are intended to cover such forms or modifications as would fall within the scope of the embodiments.

The invention claimed is:

1. A data flow control method for managing the flow of media data from a sending node to a receiving node over a communication network, the receiving node capable of playing said media data, wherein the media data transmitted to the receiving node is a sequence of data segments and the receiving node is capable of decoding the data segments and playback of said media data from the data segments, and wherein the data flow control method is implemented by the receiving node for controlling the flow of said data from the sending node to the receiving node, the method further comprising:
    identifying a condition of the communication network between said sending and receiving nodes, comprising:
        detecting the level of network traffic by the receiving node; and
        determining whether the network between the sending node and the receiving node is in a normal state or in a congested state based on the detected level of network traffic;
    identifying a condition of the data buffer at the receiving node, comprising determining a data buffer level at the receiving node from the amount of data present in the data buffer of the receiving node; and
    adjusting the media data flow through said communication network based on the identified condition of the communication network and the identified condition of the data buffer, comprising:
        if the data buffer level exceeds a first threshold and the network is in the congested state, reducing the rate of receiving data to near zero or a calculated low rate;
        if the data buffer level exceeds the first threshold and the network is in the normal state, reducing the rate of receiving data to a draining rate of the buffer during playback of said media data; and
        if the data buffer level is below a second threshold, increasing the rate of receiving data, wherein the first threshold is different from the second threshold.

2. The method of claim 1, wherein increasing the rate of receiving data comprises, at the receiving node, downloading a first received data segment in the sequence and starting to download the second data segment in the sequence only when the download progress of the first data segment reaches 80%.

3. The method of claim 1, wherein increasing the rate of receiving data comprises, at the receiving node, implementing one or more additional network paths or Transmission Control Protocol (TCP) links between the receiving node and the sending node, each TCP link capable of downloading one portion of a data segment.

4. The method of claim 3, wherein a maximum of six concurrent paths or TCP links are implemented between the sending and receiving nodes at a given time.

5. The method as claimed in claim 3, wherein the method further comprises reordering of data portions of a data segment arriving out of sequence at the receiving node via multiple network paths or TCP links out of sequence by making use of an identifier of the sequence in the header part of each data portion.

6. The method of claim 1, wherein increasing the rate of receiving data comprises, at the receiving node: detecting locations of a plurality of sending nodes capable of streaming required media data to the receiving node;
    calculating the distance between each of the plurality of sending nodes and the receiving node; and
    determining concurrent paths to at least two of the plurality of sending nodes from the receiving node.

7. The method as claimed in claim 1, wherein reducing the rate of receiving data to the draining rate of the buffer during playback of said media data comprises using a maximum of two active TCP links or active network paths to receive data such that a predefined amount of or a predefined part or portion of the data of data segment is requested over each link.

8. The method as claimed in claim 7, wherein the predefined amount of or part or portion requested is 25% of the data segment received over each link.

9. The method of claim 1, comprising using a single active network path or TCP link to receive data, such that a small predefined amount of the data of data segment is requested over said single link.

10. The method of claim 9, wherein said small predefined amount is 10% of the data of the data segment.

11. The method as claimed in claim 1, wherein the media data transmitted to the receiving node is a sequence of data segments encoded at a plurality of different bit rates, wherein the receiving node is capable of adaptively requesting for a specific data segment at a higher bit rate than the current bit rate or lower bit rate than the monitored bandwidth of the network by adjusting a current bitrate up or down, sequentially, until the bandwidth capacity of the network is reached.

12. The method as claimed in claim 11, wherein the step of adjusting the bandwidth includes increasing or reducing the bitrate sequentially to the next highest or lowest of different bitrates of the data being received at the receiving node, until the network condition becomes congested or the bandwidth limit is reached.

13. The method as claimed in claim 11, comprising requesting a higher bit rate level for the data segments by the receiving node if network condition is normal, maintaining current bit rate level if the network condition is neither normal or congested, or requesting higher bit rate level instead of the a suggested bit rate level if the network is congested.

14. The method of claimed in claim 11, including a step of reducing the playback duration of a data segment at the receiving node by re-segmenting the received data segments of a defined duration into smaller data segments, each smaller segment being of a shorter duration that the data segment.

15. The method as claimed in claim 1, including selecting a starting bit rate for receiving data at the receiving node, wherein, if the receiving node has a local cache, the step of selecting includes: caching a first data segment of the received data and requesting a second data segment at a bit rate that is one level higher than the lowest bit rate level; and if there is no local cache, the step of selecting includes: requesting the lowest bit rate as the first download TS segment by the receiving node.

16. The method as claimed in claim 1, including the steps of:
identifying a current bandwidth value of the network;
wherein, if the current receiving data bit rate for the current data segment is lesser than or equal to 50% of the current bandwidth, and if the average bit rate of the next data segments is less than or equal to 50% of the current bandwidth, the method further comprising switching to a lower bitrate for receiving data than the current receiving bit rate for the next data segment.

17. The method of claim 1, wherein the first threshold is 80% of the buffer level and the second threshold is 60% of the buffer level.

18. A system for implementing the method as claimed in claim 1, comprising a sending node and a receiving node capable of communication via a communication network, the receiving node capable of implementing the method of claim 1.

19. The system as claimed in claim 18, wherein the receiving node is a client device or a user terminal or a set top box that is capable of multimedia playback of data received from the sending node.

* * * * *